US011142595B2

(12) United States Patent
Burdzy et al.

(10) Patent No.: US 11,142,595 B2
(45) Date of Patent: Oct. 12, 2021

(54) FUNCTIONAL POLYISOBUTYLENE-CONTAINING OLIGOMERS AND POLYMERS

(71) Applicants: Henkel AG & Co. KGaA, Duesseldorf (DE); Henkel IP & Holding GmbH, Duesseldorf (DE)

(72) Inventors: Matthew P. Burdzy, South Windsor, CT (US); Dingsong Feng, Needham, MA (US); Yuheng Yang, Shanghai (CN); Tianzhi Zhang, Skillman, NJ (US)

(73) Assignees: Henkel AG & Co. KGaA, Duesseldorf (DE); Henkel IP & Holding GmbH, Duesseldorf (DE)

(*) Notice: Subject to any disclaimer, the term of this patent is extended or adjusted under 35 U.S.C. 154(b) by 0 days.

(21) Appl. No.: 16/746,123

(22) Filed: Jan. 17, 2020

(65) Prior Publication Data

US 2020/0148798 A1 May 14, 2020

Related U.S. Application Data

(60) Division of application No. 14/934,941, filed on Nov. 6, 2015, now abandoned, which is a continuation of application No. PCT/US2014/037476, filed on May 9, 2014.

(60) Provisional application No. 61/822,037, filed on May 10, 2013.

(51) Int. Cl.
*C08L 23/26* (2006.01)
*C08F 110/10* (2006.01)
*C08F 8/00* (2006.01)
*C08F 10/10* (2006.01)
*C08F 297/00* (2006.01)

(52) U.S. Cl.
CPC .............. *C08F 110/10* (2013.01); *C08F 8/00* (2013.01); *C08F 10/10* (2013.01); *C08F 297/00* (2013.01); *C08L 23/26* (2013.01); *C08F 2810/30* (2013.01); *C08F 2810/40* (2013.01)

(58) Field of Classification Search
CPC .. C08L 53/06; C08L 23/0869; C08L 23/0876; C08L 2205/02; C08L 2207/04; C08L 23/26; C09D 133/02; C09D 153/02; C08F 110/10; C08F 8/00; C08F 10/10; C08F 297/00; C08F 2810/30; C08F 2810/40
USPC .................................................. 524/425, 579
See application file for complete search history.

(56) References Cited

U.S. PATENT DOCUMENTS 4,429,099 A 1/1984 Kennedy et al.
4,486,572 A 12/1984 Kennedy
5,247,021 A 9/1993 Fujisawa et al.
5,741,859 A 4/1998 Saxena et al.
6,469,115 B1 10/2002 Faust et al.
8,344,073 B2 1/2013 Storey et al.
8,969,493 B2 3/2015 Mattmann et al.
9,512,247 B2 12/2016 Ikari et al.
9,650,449 B2 5/2017 Storey et al.
9,828,454 B2 11/2017 Burdzy et al.
2006/0264577 A1 11/2006 Faust et al.
2011/0028653 A1 2/2011 Wang et al.
2011/0306745 A1 12/2011 Storey et al.
2012/0077934 A1 3/2012 Faust et al.
2012/0208013 A1 8/2012 Clapper et al.

FOREIGN PATENT DOCUMENTS

| CN | 102015786 A | 4/2011 |
| JP | H04183702 A | 6/1992 |
| JP | 2012515252 A | 7/2012 |
| WO | 2004092227 A1 | 10/2004 |
| WO | 2008156806 A1 | 12/2008 |
| WO | 2010111280 A1 | 9/2010 |
| WO | 2013047314 A1 | 4/2013 |
| WO | 2014120386 A1 | 8/2014 |

OTHER PUBLICATIONS

Translation to JP-04183702-A (Year: 1992).*
Tripathy et al., Syntheses and Characterization of Polyisobutylene Macromonomers with Methacrylate, Acrylate, Glycidyl Ether, or Vinyl Ether End-Functionality, Macromolecules 42(12), pp. 3958-3964, 2009.
Carey et al., Advanced Organic Chemistry, 3rd edition, Part A: Structure and Mechanism, Chapter 10, pp. 539-587.
Smith et al., March's Advanced Organic Chemistry, 5th edition, Chapter 12, pp. 759-849.
Keszler et al., Styryl-Telechelic Polyisobutylene. I. Synthesis of Linear and Tri-Arm Star Styryl-Telechelic Polyisobutylenes, J. Macromol. Sci.-Chem., A21(3), pp. 307-318, 2006.
Martinez-Castro et al., Primary Halide-Terminated Polyisobutylene: End-Quenching of Quasiliving Carbocationic Polymerization with N-(ω-Haloalkyl)pyrrole, Macromolecules 2009, 42(14), pp. 4963-4971.

(Continued)

*Primary Examiner* — Kelechi C Egwim
(74) *Attorney, Agent, or Firm* — James E. Piotrowski

(57) ABSTRACT

A method of making functional polyisobutylene (PIB)-containing oligomers and polymers. By the disclosed method, the synthesis of functional PIB-containing polymers can be achieved directly under cationic polymerization conditions and does not include any post-polymerization reactions. The desired functionality is introduced by direct Electrophilic Aromatic Substitution (EAS) reaction using substituted phenyl ring carrying desirable functionalities that do not react with Lewis acid but have weak association with Lewis acid, which still allow living polymerization and EAS reaction under living cationic polymerization conditions. In the disclosed method functional polyisobutylene or isobutylene containing oligomers and polymers can be prepared using stoichiometric or near stoichiometric ratios of the capping or functionalization reagent to polymer end-chain.

13 Claims, No Drawings

(56) References Cited

OTHER PUBLICATIONS

Morgan et al., Primary Hydroxy-Terminated Polyisobutylene via End-Quenching with a Protected N-(ω-Hydroxyalkyl)pyrrole, Macromolecules, 2010, 43(3), pp. 1329-1340.

Feng et al., Facile synthesis of diphenylethylene end-functional polyisobutylene and its applications for the synthesis of block copolymers containing poly(methacrylate)s, Polymer, vol. 49, 2008, pp. 386-393.

Hackethal et al., Introducing Polar Monomers into Polyisobutylene by Living Cationic Polymerization: Structural and Kinetic Effects, Macromolecules, vol. 43, 2010, pp. 1761-1770.

\* cited by examiner

FUNCTIONAL POLYISOBUTYLENE-CONTAINING OLIGOMERS AND POLYMERS

FIELD

One aspect relates to methods of making functional polyisobutylene (PIB)-containing oligomers and polymers and the materials made thereby. Another aspect relates to compositions made from the functional polyisobutylene (PIB)-containing oligomers and polymers.

BACKGROUND

Typically, reactions do not proceed to completion. Reactants are added in excess of the stoichiometric amount calculated for that reaction to force reactions to proceed to completion.

SUMMARY

One embodiment provides a method of making functional polyisobutylene (PIB)-containing oligomers and polymers. By the disclosed method, the synthesis of functional PIB-containing polymers can be achieved directly under cationic polymerization conditions and does not include any post-polymerization reactions. The desired functionality is introduced by direct Electrophilic Aromatic Substitution (EAS) reaction using substituted phenyl ring carrying desirable functionalities that do not react with Lewis acid but have weak association with Lewis acid, which still allow living polymerization and EAS reaction under living cationic polymerization conditions. In the disclosed method functional polyisobutylene or isobutylene containing oligomers and polymers can be prepared using stoichiometric or near stoichiometric ratios of the capping or functionalization reagent to polymer end-chain.

Experience would suggest that use of stoichiometric ratios would lead to incomplete reaction and lower functionalization of the end product. Typically, non-stoichiometric ratios are used to force the reaction to completion.

Surprisingly, and contrary to common experience, using the disclosed method with a capping or functionalization reaction that is stoichiometrically quantitative or nearly quantitative provides highly functional polyisobutylene or isobutylene containing oligomers and polymers. Use of lower than stoichiometric ratios in the capping reaction lead to incomplete reaction and lower functionalization of the end product. Use of higher than stoichiometric ratios in the capping reaction lead to incomplete reaction and lower functionalization of the end product. Thus too little or too much capping reagent leads to incomplete reaction and lower functionalization of the end product.

Further, by using stoichiometric or near stoichiometric ratios of the capping or functionalization reagent to polymer end-chain the resulting quantitative or nearly quantitative product contains very little or no unreacted capping reagent(s) to remove, which makes the work-up easier, faster and provides oligomers with high purity.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION

Unless defined otherwise, all technical and scientific terms used herein have the same meaning as is commonly understood by one of ordinary skill in the art. As used herein for each of the various embodiments, the following definitions apply.

"Alkyl" or "alkane" refers to a hydrocarbon chain or group containing only single bonds. The alkane can be a straight hydrocarbon chain or a branched hydrocarbon group. The alkane can be cyclic. The alkane can contain 1 to 20 carbon atoms, advantageously 1 to 10 carbon atoms and more advantageously 1 to 6 carbon atoms. In some embodiments the alkane can be substituted. Exemplary alkanes include methyl, ethyl, n-propyl, isopropyl, isobutyl, n-butyl, sec-butyl, tert-butyl, isopentyl, neopentyl, tert-pentyl, isohexyl and decyl.

"Alkenyl" or "alkene" refers to a hydrocarbon chain or group containing one or more double bonds. The alkenyl can be a straight hydrocarbon chain or a branched hydrocarbon group. The alkene can be cyclic. The alkene can contain 1 to 20 carbon atoms, advantageously 1 to 10 carbon atoms and more advantageously 1 to 6 carbon atoms. The alkene can be an allyl group. The alkene can contain one or more double bonds that are conjugated. In some embodiments the alkene can be substituted.

"Alkoxy" refers to the structure —OR, wherein R is hydrocarbyl.

"Alkyne" or "alkynyl" refers to a hydrocarbon chain or group containing one or more triple bonds. The alkyne can be a straight hydrocarbon chain or a branched hydrocarbon group. The alkyne can be cyclic. The alkyne can contain 1 to 20 carbon atoms, advantageously 1 to 10 carbon atoms and more advantageously 1 to 6 carbon atoms. The alkyne can contain one or more triple bonds that are conjugated. In some embodiments the alkyne can be substituted.

"Aryl" or "Ar" refers to a monocyclic or multicyclic aromatic group. The cyclic rings can be linked by a bond or fused. The aryl can contain from 6 to about 30 carbon atoms; advantageously 6 to 12 carbon atoms and in some embodiments 6 carbon atoms. Exemplary aryls include phenyl, biphenyl and naphthyl. In some embodiments the aryl is substituted.

"Cationic polymerization" refers to polymerization of a monomer using a carbocationic initiator; a coinitiator such as a Lewis Acid, for example $TiCl_4$; and a cationically polymerizable monomer. The reaction is typically performed in a solvent or mixture of solvents at low temperature (for example less than 0° C.) and substantially excluding moisture.

"Ester" refers to the structure R—C(O)—O—R' where R and R' are independently selected hydrocarbyl groups. The hydrocarbyl groups can be substituted or unsubstituted.

"Halogen" or "halide" refers to an atom selected from fluorine, chlorine, bromine and iodine.

"Hetero" refers to one or more heteroatoms in a structure. Exemplary heteroatoms are independently selected from N, O and S.

"Heteroaryl" refers to a monocyclic or multicyclic aromatic ring system wherein one or more ring atoms in the structure are heteroatoms. Exemplary heteroatoms are independently selected from N, O and S. The cyclic rings can be linked by a bond or fused. The heteroaryl can contain from 5 to about 30 carbon atoms; advantageously 5 to 12 carbon atoms and in some embodiments 5 to 6 carbon atoms. Exemplary heteroaryls include furyl, imidazolyl, pyrimidinyl, tetrazolyl, thienyl, pyridyl, pyrrolyl, thiazolyl, isothiazolyl, oxazolyl, isoxazolyl, thiazolyl, quinolinyl and isoquinolinyl. In some embodiments the heteroaryl is substituted.

"Hydrocarbyl" refers to a group containing carbon and hydrogen atoms. The hydrocarbyl can be linear, branched, or cyclic group. The hydrocarbyl can be alkyl, alkenyl, alkynyl or aryl. In some embodiments, the hydrocarbyl is substituted.

"Lewis acid" refers to a chemical entity that is capable of accepting a pair of electrons.

"(Meth)acrylate" refers to acrylate and methacrylate.

"Oligomer" refers to a defined, small number of repeating monomer units such as 10-5,000 units, and advantageously 10-1,000 units which have been polymerized to form a molecule. Oligomers are a subset of the term polymer.

"One step reaction" refers to a chemical reaction to form a functionalized PIB containing oligomer or polymer wherein polymerization of isobutylene or an isobutylene containing monomer mixture and functionalization of the resulting oligomer or polymer is performed in the same reaction vessel and under cationic polymerization reaction conditions.

"Polyaromatic hydrocarbon" or "PAr" or "polycyclic aromatic hydrocarbon" refers to a fused, multicyclic aromatic group for example containing 2 to 20 ring moieties. The polyaromatic hydrocarbon can contain from 6 to about 120 ring carbon atoms; advantageously 6 to 20 ring carbon atoms. In some embodiments the polyaromatic hydrocarbon contains heteroatoms as ring atoms. Exemplary polyaromatic hydrocarbons include naphthalene, anthracene, phenanthrene and fluorene. In some embodiments the aryl is substituted.

"Polymer" refers to any polymerized product greater in chain length and molecular weight than the oligomer. Polymers can have a degree of polymerization of about 50 to about 25000. As used herein polymer includes oligomers and polymers. As used herein polymer includes homopolymers and copolymers.

"Substituted" refers to the presence of one or more substituents on a molecule in any possible position. Useful substituents are those groups that do not significantly diminish the disclosed reaction schemes. Exemplary substituents include, for example, H, halogen, (meth)acrylate, epoxy, oxetane, urea, urethane, $N_3$, NCS, CN, NCO, $NO_2$, $NX^1X^2$, $OX^1$, $C(X^1)_3$, $C(halogen)_3$, $COOX^1$, $SX^1$, $Si(OX^1)_iX^2_{3-i}$, alkyl, alcohol, alkoxy; wherein $X^1$ and $X^2$ each independently comprise H, alkyl, alkenyl, alkynyl or aryl and I is an integer from 0 to 3.

One embodiment is a method of making PIB diacrylate by direct capping living PIB using stoichiometric or near stoichiometric ratios of the capping or functionalization reagent to polymer end-chain. By using stoichiometric or near stoichiometric ratios of the capping or functionalization reagent to polymer end-chain to provide a quantitative or nearly quantitative product containing very little or no unreacted capping reagent(s). Stoichiometric or near stoichiometric ratios of the capping or functionalization reagent to polymer end-chain are ratios where functionalization of the product is maximized. Ratios (of equivalents) of the capping or functionalization reagent to polymer end-chain can be in the range of 0.7 to 5; advantageously can be in the range of 0.8 to 2. Preferably the ratio is in the range of about 1, such as 0.9 to 1.1. Ratio of the capping or functionalization reagent to polymer end-chain=equivalents of the capping or functionalization reagent/equivalents of polymer end-chain.

The capping reagent contains electro-donating groups. Suitable electro-donating groups include three major categories, phenoxy type structure, aryl substituted aromatic structure and alkyl substituted aromatic structure.

Functional groups can be any group which can undergo reaction and cause crosslinking. Some suitable functional groups include acrylate, methacrylate, isocyanate, acrylic isocyanate, silane, chlorosilane, alkoxysilane etc. and the functional groups can be either terminal groups or pendant groups in the oligomers and polymers.

Initiators with one or more initiation sites can be used for synthesis of functional PIB-containing oligomers and polymers, including bi-functional initiator, which carries one or more functional groups other than initiation site. In some embodiments PIB-containing oligomers and polymers with one or more terminal or pendant functionalities can be prepared. With the bi-functional initiator, the direct capping reaction can generate functionality at the oligomers and polymer chain end. The functional PIB with same or varied functionalities can be prepared using bi-functional initiator.

Components in PIB-containing co-oligomers and co-polymers can be any monomer which can be polymerized by cationic polymerization mechanism. Suitable monomers include styrene and isoprene.

One embodiment includes a method of making functional PIB homo-oligomer or polymer and co-polymers directly under cationic polymerization conditions and not including any post-polymerization reactions (Chart 1). The desirable functionality is introduced by a capping reaction under cationic polymerization condition. Since a living PIB center is cation bearer, electrophilic aromatic substitution (EAS) reaction can be utilized as a capping reaction by a careful choice of substitutive aromatic structures. Electro-donating groups will facilitate the EAS reaction; therefore, three major categories (Chart 2) of capping reagent are discussed: aromatics with non-aromatic electro donating groups, polyaromatics and benzoid polycyclic aromatic hydrocarbon.

The method of making functional PIB homo oligomer or polymer and co-polymers directly uses stoichiometric or near stoichiometric ratios of the capping or functionalization reagent to polymer end-chain under cationic polymerization conditions. The functional polyisobutylene or isobutylene containing oligomers and polymers prepared using stoichiometric or near stoichiometric ratios of the capping or functionalization reagent, provide quantitative or nearly quantitative functionality. Also, by using stoichiometric or near stoichiometric ratios of the capping or functionalization reagents, the resulting product contains very little or no unreacted capping reagent(s) to remove, which makes the work-up easier, faster and provides oligomers with high purity.

As shown in Example 2, acrylate functional polyisobutylene oligomers were prepared using 1.07 stoichiometric ratio of phenoxybutyl acrylate (PBA) to polymer chain-end in 15 minutes at −70 C starting from polyisobutylene di-(tertiary chloride) with molecular weight of 12000. The acrylate functionality of functional PIB is 1.70 compared to a functionality of 1.74 for the PIB di-(tertiary chloride). As shown in Example 3, the PBA capping was performed at −50 C while keeping other conditions unchanged. The obtained acrylate functionality of functional PIB is 1.60 after 15 min capping reaction. When the capping reaction was extended to 2.5 h, the obtained acrylate functionality was substantially the same (1.57). Both Examples indicate that the PBA capping reaction went very quickly at −50 C to −70 C. The lower temperature is beneficial for functionality.

When phenoxyethyl acrylate (PEA) was used as capping agent with the ratio of PEA/polymer chain=2 (See Example 4), the obtained acrylate functionality after a 3 hour capping reaction is 1.35, which is substantially lower than the 1.74 functionality of polyisobutylene di-(tertiary chloride). This is contrary to expectations as it is expected that an increase in capping or functionalization equivalents would increase the acrylate functionality and decrease the reaction time.

The functional groups useful in the method are not generally limited and include any functional group that does not interfere the capping reaction. Some useful functional groups include acrylate, methacrylate, isocyanate, acrylic isocyanate, silane, alkoxysilane and chlorosilane. The functional groups can be either end groups or pendant groups in the oligomers or polymer. The introduced functional group can be used for click chemistry.

The components in PIB-containing oligomers or polymers can be from styrene, isoprene or other monomers which can be polymerized by cationic polymerization mechanism. The weight ratio of co-monomer can range from 1% to 30%.

Below is Chart 1: Direct capping reaction scheme

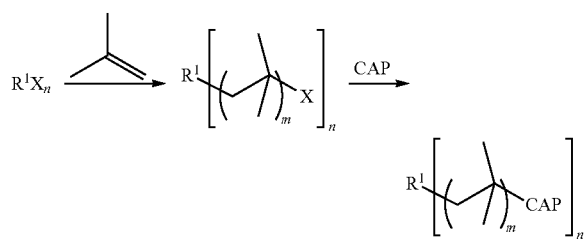

$R^1$ (Initiator Core Structure): Alkyl, Aryl, Alkenyl, Alkynyl, Alkoxy;
X (initiating site): Halide, Alkoxy, Ester
m: 2-1000
n: 1-20

Below is Chart 2: Capping agent: three categories

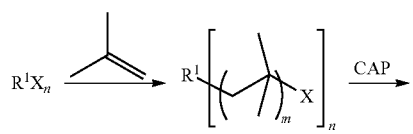

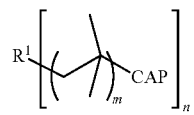

$R^1$ (Initiator Core Structure): Alkyl, Aryl, Alkenyl, Alkynyl, Alkoxy;
X (initiating site): Halide, Alkoxy, Ester
m: 2-1000
n: 1-20

Three capping agent (CAP) categories:

1) Aromatic (AR):
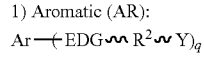
2) Polyaromatic (PAR):
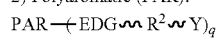
3) Benzenoid polycyclic aromatic hydrocarbon (PAH): Fused ring,
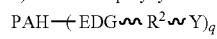

EDG (Electron Donating Group)=O, $NR^3$, S, $R^4$
$R^2$=H; Alkyl, Alkenyl, Aryl, Alkynyl; all include hetero or non-hetero; substituted or unsubstituted
$R^3$=H; Alkyl, Alkenyl, Aryl, Alkynyl; all include hetero or non-hetero; substituted or unsubstituted
$R^4$=Alkyl, Alkenyl, Aryl, Alkynyl; all include hetero or non-hetero; substituted or unsubstituted
p=1-20;
q=1-20;
Y=(meth)acrylate, OH, epoxy, oxetane, cyanate, isocyanate, urethane, urea, $NR^5R^6$, $SR^7$, $Si(OR^8)_i R^9_{3-i}$,
$R^5$, $R^6$, $R^7$, $R^8$, $R^9$=H, Alkyl, Alkenyl, Aryl, Alkynyl;
i=0-3
Hetero: N, S, O
Substituted: Halogen, (meth)acrylate, OH, epoxy, oxetane, cyanate, isocyanate, urethane, urea, $NR^5R^6$, $SR^7$, $Si(OR^8)_i R^9_{3-i}$,
$R^5$, $R^6$, $R^7$, $R^8$, $R^9$=H, Alkyl, Alkenyl, Aryl, Alkynyl;
i=0-3

The functionalized PIB containing polymers and oligomers can be used as one component of a curable composition. Other components of the curable composition include one or more of a co-monomer, catalyst, filler, antioxidant, reaction modifier, adhesion promoter, rheology modifier.

Co-Monomer

The curable composition can optionally include a co-monomer. Useable co-monomers include polymerizable materials other than the PIB functionalized oligomer or polymer.

Catalyst

The curable composition can include a catalyst to modify speed of the initiated reaction.

Filler

The curable composition can optionally include a filler. Some useful fillers include, for example, lithopone, zirconium silicate, hydroxides, such as hydroxides of calcium, aluminum, magnesium, iron and the like, diatomaceous earth, carbonates, such as sodium, potassium, calcium, and magnesium carbonates, oxides, such as zinc, magnesium, chromic, cerium, zirconium and aluminum oxides, calcium clay, fumed silicas, treated silicas, precipitated silicas, untreated silicas, graphite, synthetic fibers and mixtures thereof. When used filler can be employed in concentrations effective to provide desired physical properties in the uncured composition and cured reaction products and typically in concentrations of about 0.1% to about 70% by weight of composition.

Antioxidant

The curable composition can optionally include an antioxidant. Some useful antioxidants include those available commercially from Ciba Specialty Chemicals under the tradename IRGANOX. When used, the antioxidant should be used in the range of about 0.1 to about 15 weight percent of curable composition, such as about 0.3 to about 1 weight percent of curable composition.

Reaction Modifier.

The curable composition can include a reaction modifier. A reaction modifier is a material that will increase or decrease reaction rate of the curable elastomeric sealant composition. For example, quinones, such as hydroquinone, monomethyl ether hydroquinone (MEHQ), napthoquinone and anthraquinone, may also be included to scavenge free radicals in the curable elastomeric sealant composition and thereby slow reaction of that composition and extend shelf life. When used, the reaction modifier can be used in the range of about 0.1 to about 15 weight percent of curable composition.

Adhesion Promoter.

The curable composition can include one or more adhesion promoters that are compatible and known in the art. Examples of useful commercially available adhesion promoters include octyl trimethoxysilane (commercially available from Chemtura under the trade designation A-137), glycidyl trimethoxysilane (commercially available from Chemtura under the trade designation A-187), methacryloxypropyl trimethoxysilane (commercially available from Chemtura under the trade designation of A-174), vinyl trimethoxysilane, tetraethoxysilane and its partial condensation products, and combinations thereof. When used, the adhesion promoter can be used in the range of about 0.1 to about 15 weight percent of curable composition.

Rheology Modifiers.

The curable composition can optionally include a thixotropic agent to modify rheological properties of the uncured composition. Some useful thixotropic agents include, for example, silicas, such as fused or fumed silicas, that may be untreated or treated so as to alter the chemical nature of their surface. Virtually any reinforcing fused, precipitated or fumed silica may be used.

Examples of treated fumed silicas include polydimethylsiloxane-treated silicas and hexamethyldisilazane-treated silicas. Such treated silicas are commercially available, such as from Cabot Corporation under the tradename CAB-O-SIL ND-TS and Degussa Corporation under the tradename AEROSIL, such as AEROSIL R805.

Examples of untreated silicas include commercially available amorphous silicas such as AEROSIL 300, AEROSIL 200 and AEROSIL 130. Commercially available hydrous silicas include NIPSIL E150 and NIPSIL E200A manufactured by Japan Silica Kogya Inc.

When used rheology modifier can be employed in concentrations effective to provide desired physical properties in the uncured composition and cured reaction products and typically in concentrations of about 0.1% to about 70% by weight of composition.

The curable elastomeric composition can optionally include other conventional additives at known concentrations effective to provide expected properties so long as they do not inhibit the desirable properties such as curing mechanism, elongation, low temperature sealing force, tensile strength, chemical resistance. Example of such optional additives include, for example, reinforcing materials such as fibers, diluents, reactive diluents, coloring agents and pigments, moisture scavengers such as methyltrimethoxysilane and vinyltrimethyloxysilane and the like may be included.

Exemplary Composition Ranges:

A curable composition can typically comprise:

about 10 to 95 wt % of a functional group containing PIB oligomer or polymer;
about 0 to 80 wt % co-monomer;
about 0 to 20 wt % cross-linking agent;
about 0 to 20 wt % of a catalyst;
about 0 to 70 wt % of a filler;
about 0 to 15 wt % of a antioxidant;
about 0 to 15 wt % of a reaction modifier;
about 0 to 15 wt % of adhesion promoter;
about 0 to 70 wt % of rheology modifier;
about 0 to 10 wt % of other conventional additives.

Specific physical properties required for the uncured, composition will depend on application. For example, uncured composition viscosity can be formulated for application method and desired cycle time.

Specific physical properties required for cured reaction products of the composition will depend on application, minimum and maximum operating temperatures within the application, desired tensile strength at high temperatures and desired sealing force at low temperatures.

In one embodiment the curable composition can be used as an adhesive to bond substrates together. The curable composition is believed to be useful in bonding components for films, laminations, composite structures and electronic or electrical devices.

In one embodiment the curable composition can be used as a sealant. Components to be sealed by the disclosed curable compositions have a first predetermined sealing surface that is aligned with a second predetermined sealing surface. Typically, the aligned sealing surfaces are in a fixed relationship and move very little relative to each other. The aligned sealing surfaces are generally in fluid communication with a chamber. The seal formed between the aligned sealing surfaces prevents movement of materials between the surfaces and into, or out of, the chamber.

One or both of the sealing surfaces can be machined or formed. The predetermined sealing surfaces are designed to allow a curable composition to be disposed on one or both surfaces during initial assembly of the component to form a seal therebetween. Design of the predetermined sealing surfaces enhances parameters such as alignment of the surfaces, contact area of the surfaces, surface finish of the surfaces, "fit" of the surfaces and separation of the surfaces to achieve a predetermined sealing effect. A predetermined sealing surface does not encompass surfaces that were not identified or designed prior to initial assembly to accommodate a seal or gasket, for example the outside surface of a component over which a repair material is molded or applied to lessen leaking. Sealing surfaces on an engine block and oil pan or engine intake manifold are examples of sealing surfaces in fixed relationship.

In one embodiment the disclosed curable compositions can be in a flowable state for disposition onto at least a portion of one sealing surface to form a seal between the surfaces when they are aligned. The curable composition can be applied as a film over the sealing surface. The curable composition can also be applied as a bead in precise patterns by tracing, screen printing, robotic application and the like. In bead applications the disclosed compositions are typically dispensed as a liquid or semi-solid under pressure through a nozzle and onto the component sealing surface. The nozzle size is chosen to provide a line or bead of composition having a desired width, height, shape and volume. The curable composition can be contained in a small tube and dispensed by squeezing the tube; contained in a cartridge and dispensed by longitudinal movement of a cartridge sealing member; or contained in a larger container such as a 5 gallon pail or 55 gallon drum and dispensed at the point of use by conventional automated dispensing equipment. Container size can be chosen to suit the end use application.

In one embodiment the curable composition can be used to form a formed in place gasket (FIPG). In this application the composition is dispensed onto a first predetermined sealing surface. The first predetermined sealing surface and dispensed composition is aligned and sealingly engaged with a second predetermined sealing surface before the composition has fully cured. The composition will adhere to both sealing surfaces as it cures.

In one embodiment the curable composition can be used to form a cured in place gasket (CIPG). In this application the composition is dispensed onto a first predetermined sealing surface and allowed to substantially cure before contact with a second predetermined sealing surface. The first sealing surface and cured composition is sealingly engaged with the second sealing surface thereby compressing the cured composition to provide a seal between the sealing surfaces. The composition will adhere to only the first sealing surface.

In one embodiment the curable composition can be used to form a mold in place gasket (MIPG). In this application the part comprising the first predetermined sealing surface is placed in a mold. The composition is dispensed into the mold where it contacts the first sealing surface. The composition is typically allowed to cure before removal from the mold. After molding, the first sealing surface and molded composition is sealingly engaged with a second predetermined sealing surface thereby compressing the cured composition to provide a seal between the sealing surfaces. The composition will adhere to only the first sealing surface.

In one embodiment the curable composition can be used in liquid injection molding (LIM). In this application uncured composition is dispensed into a mold without any predetermined sealing surface under controlled pressure and temperature. The composition is typically allowed to cure before removal from the mold. After removal the molded part will retain its shape. In sealing applications the molded gasket is disposed between two predetermined sealing surfaces and compressed to provide a seal between the sealing surfaces.

The following examples are included for purposes of illustration so that the disclosure may be more readily understood and are in no way intended to limit the scope of the disclosure unless otherwise specifically indicated.

IB is isobutylene
m-DCC is meta dicumyl chloride

Example 1

(PIB di-tert-Cl preparation): IB polymerization is carried out at −80° C. under a dry nitrogen atmosphere in a glove box using [IB]=5.1 M, [m-DCC]=33 mM and [Lutidine]=10 mM using methylchloride/hexane (38/62 wt/wt) mixture. TiCl4 (=15 mM) is added to start polymerization. After 30 min polymerization, another portion TiCl4 (=15 mM) is added and the reaction is allowed to proceed for 3 hours (conversion of IB is monitored in-situ to ensure complete conversion). After full conversion of IB, 0.33 eq of MeOH to the total amount to TiCl4 was added to the reactor to quench the cationic reaction.

Work-Up: The reaction mixture is stripped to remove methylchloride and then quenched with 5% wt aqueous NaOH solution. The organic layer is washed with water twice and with methanol twice. The polymer solution is stripped to remove hexane. PIB di-tert-Cl was obtained as a viscous liquid with a functionality of 1.74.

Example 2

(phenoxybutyl acrylate end capping): PIB di-tert-Cl (41.00 g) was dissolved in anhydrous n-butyl chloride (109.85 g) in a moisture-free environment. The mixture was then chilled down in a −70 C cool bath with stir (210 rpm). n-Hexane (10.15 g), lutidine (0.10 g) and phenoxybutyl acrylate (1.60 g) were added to above reaction mixture in order. The reaction temperature was continuously monitored until −70 C was reached. TiCl4 (10.34 g) was then added at this temperature in one portion. The mixture was allowed to react at this condition for 15 min. 1H NMR sample aliquot was taken and quenched with pre-chilled MeOH, a functionality of 1.77 was achieved by peak area integration calculation. This near stoichiometric (1.07 eq) chain end capping reaction was achieved quantitatively in a short period of time, and maintained the original functionality (1.74) without side reactions.

Example 3

(phenoxybutyl acrylate end capping): PIB di-tert-Cl (41.00 g) was dissolved in anhydrous n-butyl chloride (109.85 g) in a moisture-free environment. The mixture was then chilled down in a −70 C cool bath with stir (210 rpm). n-Hexane (10.15 g), lutidine (0.10 g) and phenoxybutyl acrylate (1.60 g) were added to above reaction mixture in order. The reaction temperature was continuously monitored until −55 C was reached. TiCl4 (10.34 g) was then added at this temperature in one portion. The mixture was allowed to react at this condition for 15 min. 1H NMR sample aliquot was taken and quenched with pre-chilled MeOH, a functionality of 1.60 was achieved by peak area integration calculation. Additional reaction time did not provide a better functionality: F=1.57 at 2.5 hr. Slight variation of functionality might be due to the NMR system error in integration.

Example 4

(phenoxyethyl acrylate end capping): PIB di-tert-Cl (39.65 g) was dissolved in anhydrous n-butyl chloride (158 g) in a moisture-free environment. The mixture was then chilled down in a −73 C cool bath with stir (140 rpm). Lutidine (0.10 g) and phenoxyethyl acrylate (3.56 g) were added to above reaction mixture in order. The reaction temperature was continuously monitored until −73 C was reached. TiCl4 (14.27 g) was then added at this temperature in one portion. The mixture was allowed to react at this condition for 3 hours. 1H NMR sample aliquot was taken and quenched with pre-chilled MeOH, a functionality of 1.35 was achieved by peak area integration calculation. Additional reaction time did not provide a better functionality.

While preferred embodiments have been set forth for purposes of illustration, the foregoing description should not be deemed a limitation of the disclosure herein. Accordingly, various modifications, adaptations and alternatives may occur to one skilled in the art without departing from the spirit and scope of the present disclosure.

What is claimed:

1. A method of preparing a PIB oligomer or polymer in a one step reaction, comprising:
disposing an amount of an initiator having the structure $R^1X_n$ into a reactor;
disposing an amount of isobutylene into the reactor;
reacting the initiator with the isobutylene under cationic polymerization conditions to form a reaction mixture comprising an intermediate having the structure

disposing a capping reagent into the reaction mixture; and
reacting the capping reagent with the intermediate in the reactor under cationic polymerization condition to form the PIB oligomer or polymer having the structure

where:
$R^1$ is an initiator core structure independently selected from alkyl, heteroalkyl, aryl, heteroaryl, alkenyl, heteroalkenyl, alkynyl, heteroalkynyl and alkoxy;
X is an initiating site bonded to the initiator core structure independently selected from halide, alkoxy, ester;
m is an integer from 2 to about 1,000;
n is 2 to 3;
the capping reagent selected from one or more of following structures 1 to 3;

    1

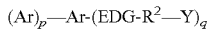    2

    3 where EDG is an electron donating group selected from O, $NR^3$, S, $R^4$;
$R^2$ can be independently selected from H, alkylene, heteroalkylene, alkenylene, heteroalkenylene, alkynylene, heteroalkynylene, arylene, heteroarylene;
$R^3$ can be independently selected from H, alkyl, heteroalkyl, alkenyl, heteroalkenyl, alkynyl, heteroalkynyl, aryl, heteroaryl;
$R^4$ can be independently selected from H, alkylene, heteroalkylene, alkenylene, heteroalkenylene, alkynylene, heteroalkynylene, arylene, heteroarylene;
p is an integer from about 1 to about 20;
q is an integer from about 1 to about 20;
Y can be independently selected from (meth)acrylate, OH, epoxy, oxetane, cyanate, isocyanate, urethane, urea, $NR^5R^6$, $SR^7$, $Si(OR^8)_tR^9_{3-t}$, where $R^5$, $R^6$, $R^7$, $R^8$, $R^9$ can be independently selected from H, alkyl, heteroalkyl, alkenyl, heteroalkenyl, alkynyl, heteroalkynyl, aryl, heteroaryl;
a ratio of the capping reagent to intermediate end-chain calculated as ratio=equivalents of the capping reagent/equivalents of intermediate end-chain is in the range of 0.7 to 2; and
the PIB oligomer or polymer has an endcap functionality of 1.6 to 2.0.

2. The method of claim 1 wherein a ratio of the capping reagent to intermediate end-chain calculated as ratio=equivalents of the capping reagent/equivalents of intermediate end-chain is in the range of 0.8 to 2.

3. The method of claim 1 wherein a ratio of the capping reagent to intermediate end-chain calculated as ratio=equivalents of the capping reagent/equivalents of intermediate end-chain is in the range of 0.9 to 1.4.

4. The method of claim 1 wherein a ratio of the capping reagent to intermediate end-chain calculated as ratio=equivalents of the capping reagent/equivalents of intermediate end-chain is substantially stoichiometric.

5. The method of claim 1 wherein EDG for capping reagent 1) is selected from $NR^3$, S, $R^4$.

6. A PIB oligomer or polymer prepared by the method of claim 1.

7. A curable composition comprising the PIB containing oligomer or polymer of claim 1 and optionally further comprising one or more of a co-monomer, catalyst, filler, antioxidant, reaction modifier, adhesion promoter, rheology modifier.

8. Cured reaction products of the curable composition of claim 7.

9. The method of claim 1 wherein Y is selected from (meth)acrylate, epoxy, urethane and urea.

10. The method of claim 1 wherein the capping reagent is structure 1

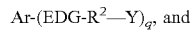    1

EDG is selected from O or S;
$R^2$ is selected from alkyl, alkenyl or alkynyl;
Y is selected from (meth)acrylate, epoxy, urethane and urea.

11. The method of claim 1 wherein n is 2.

12. The method of claim 1 wherein the initiator is dicumyl chloride.

13. The method of claim 1 wherein the PIB oligomer or polymer has an endcap functionality of 1.8 to 2.0.

* * * * *